United States Patent [19]

Kodaira et al.

[11] Patent Number: 4,671,639
[45] Date of Patent: Jun. 9, 1987

[54] CAMERA WITH ELECTROMAGNETICALLY DRIVEN LENS BARREL

[75] Inventors: Takanori Kodaira; Akira Egawa, both of Tokyo; Akihiro Namai, Kanagawa, all of Japan

[73] Assignee: Canon Kabushiki Kaisha

[21] Appl. No.: 857,524

[22] Filed: Apr. 23, 1986

Related U.S. Application Data

[63] Continuation of Ser. No. 756,310, Jul. 17, 1985, abandoned.

[30] Foreign Application Priority Data

Jul. 17, 1984 [JP] Japan .................................. 59-148932
Jul. 17, 1984 [JP] Japan .................................. 59-148933

[51] Int. Cl.$^4$ ........................... G03B 3/10; G03B 9/08
[52] U.S. Cl. .................................. 354/400; 354/234.1
[58] Field of Search .............................. 354/400–405, 354/435–440, 456, 195.1, 230, 234.1

[56] References Cited

U.S. PATENT DOCUMENTS

| | | | |
|---|---|---|---|
| 4,504,132 | 3/1985 | Martin et al. | 354/195.1 |
| 4,505,567 | 3/1985 | Hirohata et al. | 354/403 |
| 4,508,442 | 4/1985 | Hirohata | 354/400 |
| 4,540,264 | 9/1985 | Daitoku et al. | 354/400 |
| 4,560,266 | 12/1985 | Namai et al. | 354/400 |

*Primary Examiner*—W. B. Perkey
*Attorney, Agent, or Firm*—Toren, McGeady and Goldberg

[57] ABSTRACT

In a camera which is provided with an electromagnetically driven lens barrel and is arranged to control a shutter by driving a rotor with an electromagnetic force generated by energizing a coil printed on the rotor, power supply to the coil is effected in a pulse-like manner for drawing out a photo-taking lens and in a continuous manner for driving the shutter.

16 Claims, 7 Drawing Figures

CAMERA WITH ELECTROMAGNETICALLY DRIVEN LENS BARREL

This is a continuation of application Ser. No. 756,310 filed July 17, 1985, now abandoned.

BACKGROUND OF THE INVENTION

1. Field of the Invention:

This invention relates to a camera which has an electromagnetically driven lens barrel and is arranged to draw out the lens barrel and to perform exposure control with an electromagnetic driving force.

2. Description of the Prior Art:

An apparatus of the kind arranged to perform automatic focus control and exposure control with an electromagnetic force obtained by effecting power supply to a coil disposed within a magnetic field has been known from the specification of U.S. Pat. No. 4,396,267. However, this apparatus has a shortcoming in that the control circuit thereof becomes complex as the coil must have the power supply effected in different directions for automatic focus control and exposure control. In this connection, another apparatus which is capable of effecting power supply in one and the same direction for both automatic focus control and exposure control has been known from the specification of U.S. Pat. No. 4,505,567. However, the apparatus necessitates a charging arrangement for charging in association with film winding a spring force for urging the lens barrel. The latter apparatus, therefore, must have a transmission device interposed in between the film winding device of the camera body and the lens barrel. This has resulted in a complex structural arrangement.

SUMMARY OF THE INVENTION

It is an object of the present invention to provide a camera which solves the above-stated problems of the prior art with an electromagnetically driven lens barrel arranged to have a photo-taking lens drawn out by effecting power supply to the coil of a rotor in a pulse-like manner and to drive a shutter by continuously effecting the power supply to the coil of the rotor.

It is another object of the invention to provide a camera having an electromagnetically driven lens barrel, wherein a photo-taking lens is drawn out by the last returning stroke of a rotor which is arranged to close a shutter, so that the photo-taking lens can be prevented from being drawn out while the shutter is open.

These and further objects and features of the invention will become apparent from the following detailed description of a preferred embodiment thereof taken in connection with the accompanying drawings.

DETAILED DESCRIPTION OF THE PREFERRED EMBODIMENT

Figure 1:
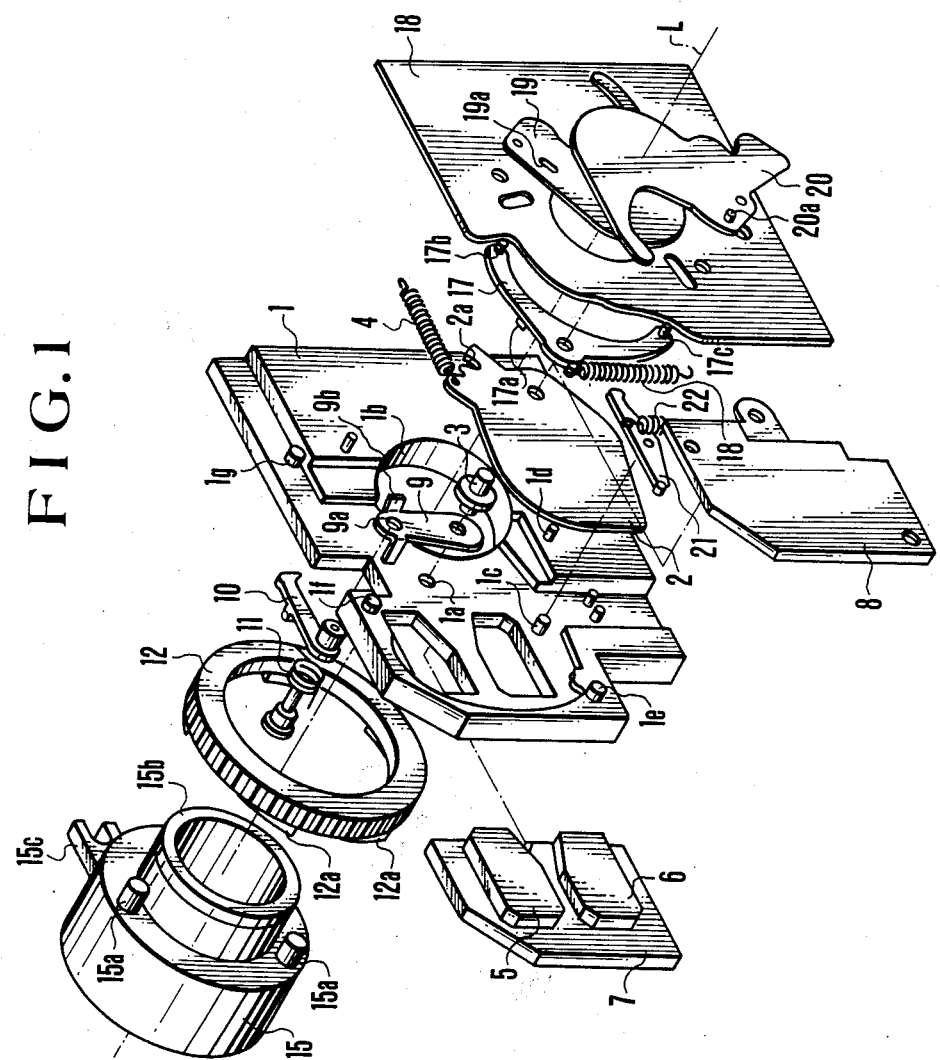
FIG. 1 is an exploded view showing, as an embodiment of this invention, the structual arrangement of a camera provided with an electromagnetically driven lens barrel.

The following describes an embodiment of this invention with reference to the accompanying drawings: FIG. 1 shows the essential parts of a camera which is provided with an electromagnetically driven lens barrel and is arranged according to this invention. The illustration includes a shutter base plate 1; and a rotor 2 which has coils printed on both sides thereof. A shaft 3 is fitted into a hole 1a provided in the shutter base plate 1. The rotor 2 is arranged to be turnable on the shaft 3 and is urged by a spring 4 to turn clockwise. Permanent magnets 5 and 6 are magnetized in the directions of their plate thickness oppositely to each other. These permanent magnets 5 and 6 are secured to a first yoke 7. A second yoke 8 is spaced a predetermined distance from the permanent magnets. A magnetic circuit is formed by the permanent magnets and the first and second yokes 7 and 8. The above-stated rotor 2 is interposed in between the second yoke 8 and the permanent magnets 5 and 6. When the rotor is energized, an electromagnetic driving force is developed to work in the counterclockwise direction.

Figure 2:
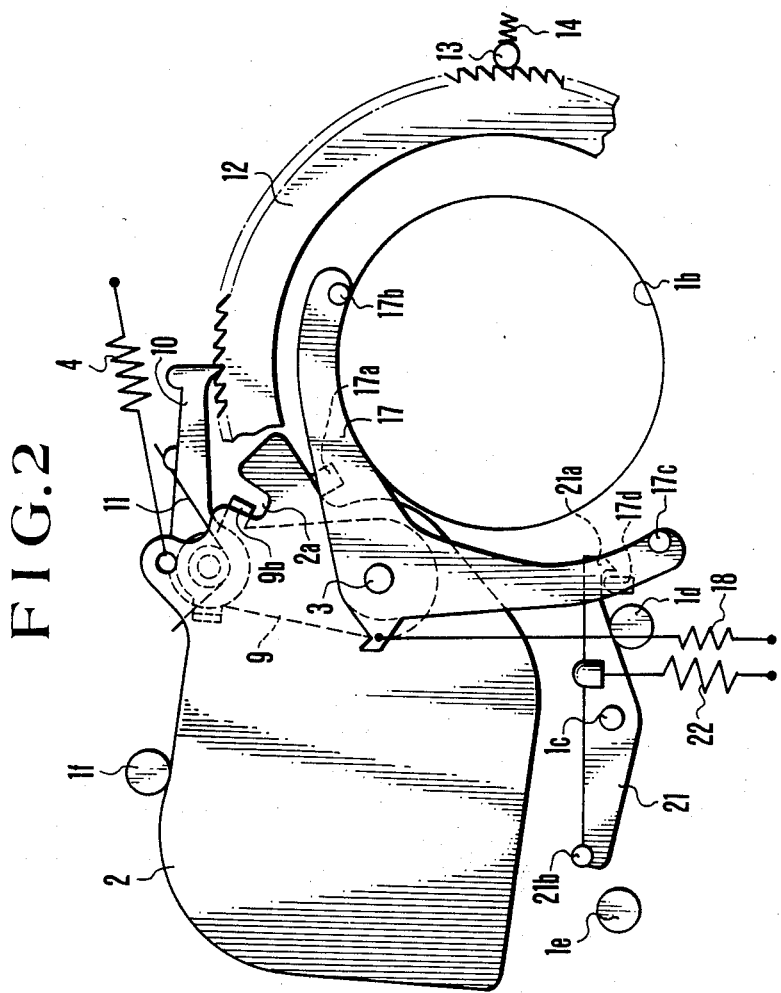
FIG. 2 is a front view of the essential part of the camera shown in FIG. 1.
Figure 3:
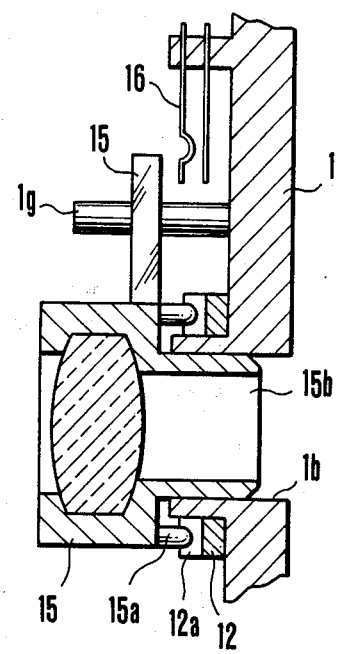
FIG. 3 is a sectional view of the lens barrel of the same camera.

A lens barrel driving lever 9 is fitted on the shaft 3 and is arranged to be turnable together with the rotor 2. A driving pawl 10 is pivotally carried by a hole 9a provided in the fore end of the lens barrel driving lever 9. A spring 11 is arranged to urge this driving pawl to move clockwise. A claw part 9b is formed on the lens barrel driving lever 9 and has its fore end located at a slot 2a of the rotor 2. A rotating ring 12 is arranged to be turnable about a photo-taking optical axis L. The periphery of the rotating ring 12 is formed in the shape of teeth which engage the driving pawl 10. Further, a click arrangement is arranged to have a ball 13 pressed against these teeth by means of a spring 14 as shown in FIG. 2. A plurality of cams 12a of the same shape are disposed in front of the rotating ring 12. Pins 15a of a lens barrel 15 are abutting on the surfaces of these cams 12a. A spring (not shown) is urging the lens barrel 15 toward the cams 12a of the rotating ring 12. The lens barrel 15 is provided with a rear protrudent part 15b which is fitted into a hole 1b of the shutter base plate 1; and an arm part 15c which has a slot. A pin 1g which is provided on the shutter base plate 1 is fitted into the slot of the arm part 15c to prevent the lens barrel 15 from turning. However, the lens barrel 15 is arranged to be slibable back and forth. When the rotating ring 12 is turned clockwise, the lens barrel 15 is drawn out by the cams 12a of the rotating ring. When the rotating ring 12 is further turned, the pin 15a of the lens barrel 15 falls off the cam 12a to bring the lens barrel 15 back to the initial position thereof where it is not drawn out. A switch 16 is provided on the shutter base plate 1 as shown in FIG. 3. With the lens barrel 15 brought back to the initial position, the switch 16 is closed by the arm part 15c of the lens barrel. An opening lever 17 is urged by a spring 18 to turn counterclockwise on the shaft 3. However, since a claw part 17a of the lever 17 is abutting on the rotor 2 as shown in FIG. 2, the lever 17 does not turn. The opening lever 17 is provided with pins 17b and 17c, which are provided at both ends of the lever and are inserted into slots 19a and 20a formed in shutter blades 19 and 20 via a shutter receiving plate 18. When the opening lever 17 turns counterclockwise, the shutter blades 19 and 20 open. A lock lever 21 is urged by a spring 22 to turn clockwise on a pin 1c which is provided on the shutter base plate 1. The clockwise turn of the lock lever 21 is prevented by a stopper pin 1d which is provided on the shutter base plate 1. The lock lever 21 is provided with a hook part 21a which is formed at one end of the lever 21 and is arranged to engage a locking part 17d of the opening lever 17; and a protrudent part 21b which is formed at the other end of the lever 21 and is arranged to have the rotor 2 to abut thereon. The rotor 2 comes to abut on the protrudent part 21b of the lock lever 21 immediately before its counterclockwise rotation is stopped by a stopper 1e.

Figure 4:
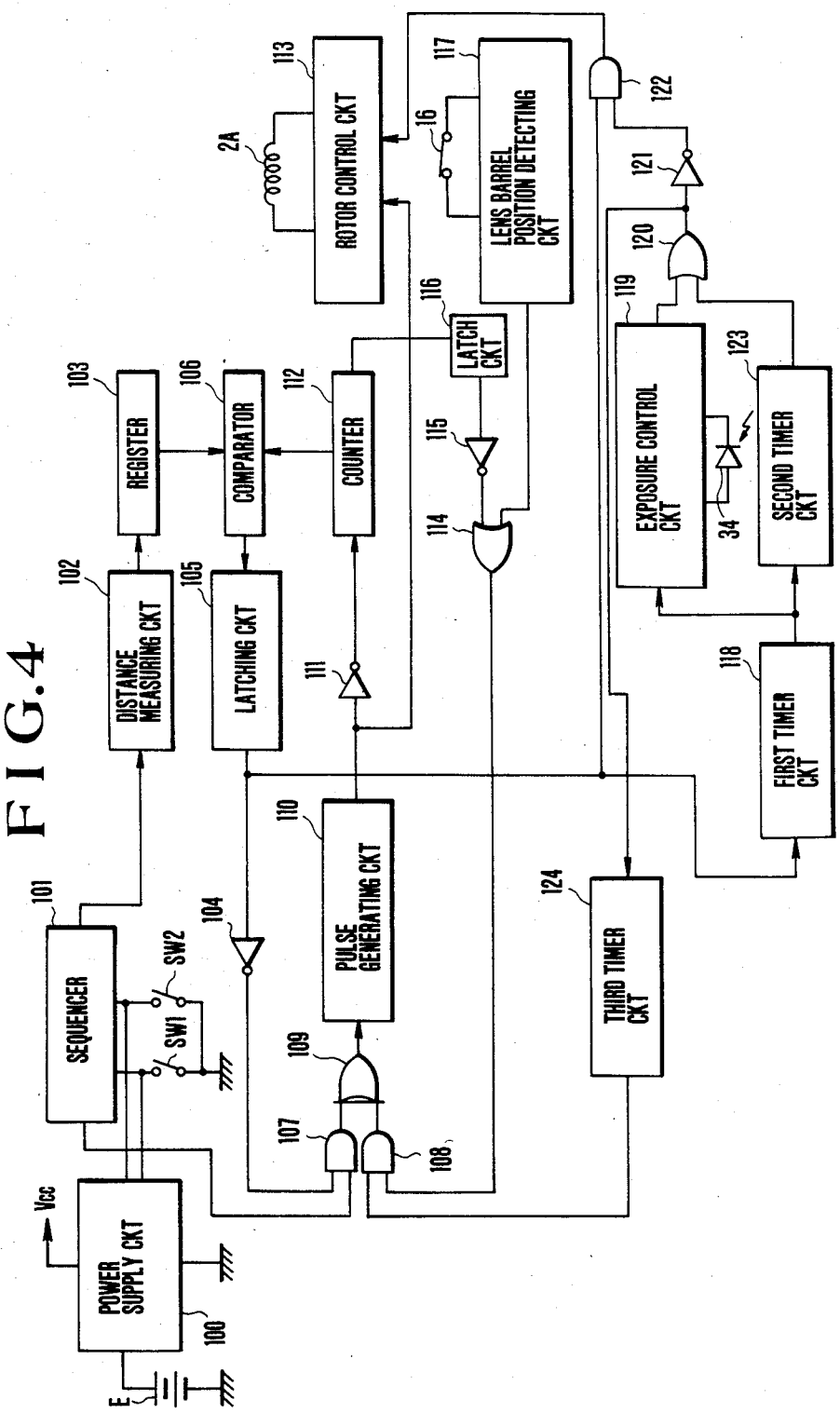
FIG. 4 is a circuit diagram showing the control circuit of the same camera.

FIG. 4 shows the control circuit of the camera shown in FIGS. 1 to 3. The illustration includes a power supply battery E; a power supply circuit 100; a sequencer 101 which is arranged to control the operation of the camera; a switch SW1 which is arranged to turn on in response to a first operating stroke of a shutter release button; a switch SW2 arranged to turn on in response to a second stroke of the shutter release button; a known automatic distance measuring circuit 102; a register 103 arranged to store photographing distance information which is produced from the automatic distance measuring circuit 102; an inverter 104; a latching circuit 105; a comparator 106; AND gates 107 and 108; an OR gate 109; and a pulse generating circuit 110. The output of this pulse generating circuit 110 is arranged to be applied via an inverter 111 to a counter 112. The counted value obtained by this counter 112 is arranged to be compared with the output value of the register 103 at the comparator 106. The output of the comparator 106 is arranged to be supplied via the latching circuit 105 and the inverter 104 to the AND gate 107 together with the output of the sequencer 101. The output of the AND gate 107 is supplied via the OR gate 109 to the pulse generating circuit 110. A rotor control circuit 113 is arranged to control power supply to the coil 2A which is printed on the above-stated rotor 2. The output of the above-stated counter 112 is arranged to be applied via a latch circuits, an inverter 115 and an OR gate 114 to the AND gate 108. A lens barrel position detecting circuit 117 is connected to the above-stated switch 16. The output of this lens barrel position detecting circuit 117 is arranged to be applied via the OR gate 114 to the AND gate 108. A first timer circuit 118 is arranged to begin counting in response to the output signal of the latching circuit 105. The output of the first timer circuit 118 is applied to an exposure control circuit 119. After the lapse of a period of time corresponding to the output of a light receiving element or photosensitive element 34, the exposure control circuit 119 applies a signal to an AND gate 122 via an OR gate 120 and an inverter 121. A second timer circuit 123 is arranged to begin to count a terminating time in response to the output of the first timer circuit 118. After the lapse of the terminating time, the second timer circuit 123 produces a signal, which is supplied via the OR gate and the inverter 121 to and AND gate 122. The AND gate 122 is arranged to receive also the output of the latching circuit 105. The output of the AND gate 122 is applied to the rotor control circuit 113 together with the output of the pulse generating circuit 110. A third timer circuit 124 is arranged to begin to operate when the output of the OR gate 120 is applied thereto. The output of the third timer circuit 124 is applied to the AND gate 108 together with the output of the OR gate 114. The output of the AND gate 108 is arranged to be supplied via the OR gate 109 to the pulse generating circuit 110.

Figure 5A:
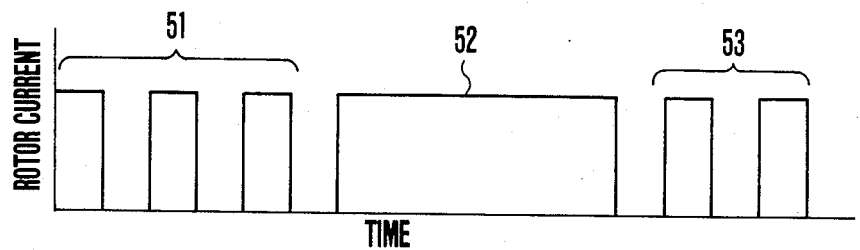
FIGS. 5A and 5B show the relation of the rotor rotation to time of the same camera.
Figure 5B:
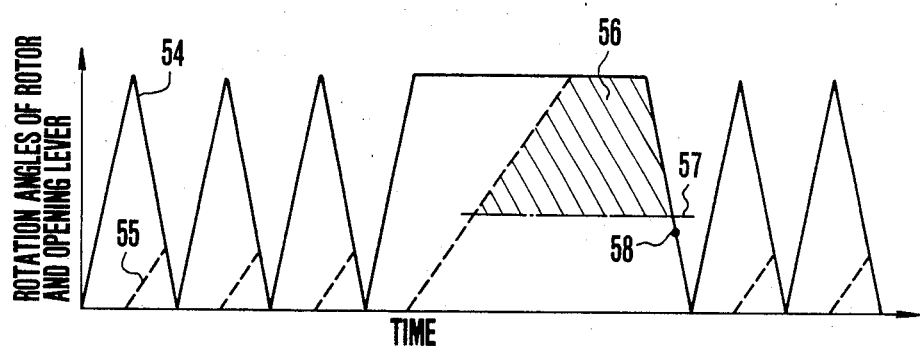

Referring to FIGS. 5A and 5B, the embodiment which is arranged as described above operates as follows: When the switch SW1 is closed by the first operation stroke of the release button, the power supply circuit 100 supplies power supply voltage to each applicable circuit. Then, a signal is supplied from the sequencer 101 to the known automatic distance measuring circuit 102. A photographing distance is measured. A photographing distance information signal which corresponds to the position of some of the lens barrel driving teeth is supplied to the register 103. When the shutter release button is depressed further than the first stroke, the switch SW2 turns on. Then, a power source is latched by the power supply circuit 100 until completion of the operation of the camera. A high level signal is supplied from the sequencer 101 to the AND gate 107. Since the output of the latching circuit 105 is at a low level in the initial state thereof, the output level of the circuit 105 is inverted by the inverter 104 into a high level output. The high level output thus obtained is supplied to the other input terminal of the AND gate 107. Therefore, the output level of the AND gate 107 becomes high. The output level of the OR gate 109 then changes from a low level to a high level to bring the pulse generating circuit 110 into an operative state. The pulse generating circuit 110 operates for "on" time and "off" time which are suitably predetermined for diriving the lens barrel and supplies the rotor control circuit 113 with alternating pulses at intervals of, for example, 10 msec as indicated by a reference numeral 51 in FIG. 5A. During the above-stated "on" time, power supply is effected to the coil 2A of the rotor 2. With the coil 2A of the rotor 2 thus energized, the rotor 2 turns counterclockwise against the force of the spring 4. When the rotor 2 comes halfway in the counterclockwise turn, the edge of the slot 2a of the rotor 2 abuts on the claw part 9b of the lens driving lever 9. This causes the lens driving lever 9 to turn also counterclockwise. The driving pawl 10 which is pivotally carried by the fore end of the lens driving lever 9 moves to the left. The driving pawl 10 overrides one tooth of the rotating ring 12 to engage another tooth locating on the left side of the tooth. Further, with the rotor 2 turning counterclockwise, the claw part 17a of the opening lever 17 moves away from the rotor 2. Therefore, the opening lever 17 is caused by the force of the spring 18 to turn counterclockwise to a slight extent until the claw part 17d comes to engage the hook 21a of the locking lever 21. When the rotor 2 comes close to the end point of its turning movement, the rotor 2 abuts on the protrudent part 21b of the locking lever 21. This causes the lever 21 to turn counterclockwise. The hook 21a is, therefore, disengaged from the claw part 17d of the opening lever 17 to allow the lever 17 to turn counterclockwise. The turning movement of the rotor 2 then comes to a stop as the rotor 2 abuts on the stopper 1e of the shutter base plate 1. After that, when the power supply to the coil 2A of the rotor 2 is cut off, the force of the spring 4 causes the rotor 2 to turn clockwise. When the rotor 2 thus moves back to a certain extent, the force of the spring 22 causes the locking lever 21 to turn clockwise to come back to a position where it abuts on the stopper 1d of the shutter base plate 1. With the rotor 2 turning further, the edge of the slot 2a of the rotor 2 comes to abut on the claw part 9b of the lens driving lever 9. The lens driving lever 9 also turns clockwise. The driving pawl 10 is then caused by this to move to the right. The rightward move of the pawl 10 causes the rotating ring 12 to turn clockwise to the extent of one tooth. The ball 13 then engages a next tooth. Further, with the rotor 2 turning clockwise, it comes to collide against the claw part 17a of the opening lever 17 which is moving counter-clockwise. This causes the opening lever 17 to turn also clockwise together with the rotor 2. As mentioned in the foregoing, the shutter blades 19 and 20 turn in their opening direction when the opening lever 21 turns counter-clockwise. However, since the shutter blades 19 and 20 are overlapped to a necessary degree, the shutter blades 19 and 20 do not come to open until the opening lever 21 turns to a certain extent. Such being the arrangement of the shutter blades and since the power supply to the rotor 2 is effected only for a short period of time, the collision between the rotor 2 and the claw part 17a of the opening lever 17 takes place before the shutter blades 19 and 20 open and thus no exposure is effected at that moment. With the rotor further turning clockwise, a slanting face of the left side of the claw part 17a of the opening lever 17 which has been turning together with the rotor 2 comes to abut on a slanting face of the right side of the hook of the locking lever 21 immediately before the rotor 2 reaches its initial position (see FIG. 2). However, since both of them are slanting faces, the locking lever 21 is caused to turn counterclockwise in such a manner that, at the point of time when the rotor 2 resumes the initial position as shown in FIG. 2, the claw part 17d is again locked by the hook 21a of the locking lever 21. The operation of the rotor 2 is performed in the above-stated manner when one pulse portion of a current is allowed to flow to the coil 2A of the rotor. In this instance, no exposure is effected and the lens barrel 15 is drawn out to an extent of one tooth. The lens barrel 15 is thus drawn out with the above-stated operation repeated.

The output of the pulse generating circuit 110 is inverted by the inverter 111. The inverted output is applied to the counter 112. The counter 112 is arranged to up count at the end of a period during which the power supply to the rotor 2 is on. Therefore, the counter 112 counts to show by how many teeth the lens barrel 15 has been driven. The counted value of the counter 112 is constantly compared with the value of the register 103 by the comparator 106. Therefore, the position of the lens barrel can be considered to have come to agree with the photographing distance when the two comparison values coincide with each other. Then, the output level of the comparator 106 becomes high and the output is latched by the latching circuit 105. The latched output is then inverted by the inverter 104 into a low level. The low level signal thus obtained is supplied to the AND gate 107 to make the output level of the AND gate 107 also low. The output level of the OR gate 109 also becomes low to render thereby the pulse generating circuit 110 inoperative. The control over the rotor 2 comes to an end and the lens barrel is no longer driven.

The output of the latching circuit 105 is applied to the first timer circuit 118 and the AND gate 122. Meanwhile, to the other input terminal of the AND gate 122 is supplied the output of the OR gate 120 which is at a low level but is inverted into a high level signal by the inverter 121 before it is supplied to the AND gate 122. Therefore, the output level of the AND gate 122 becomes high. With the output level of the AND gate 122 having become high, the rotor control circuit 113 causes power supply to be effected to the coil 2A of the rotor 2. As a result of this, the shutter blades begin to open and an exposure begins. The first timer circuit 118 counts a length of time between the commencement of power supply to the coil 2A and that of an exposure initiated by the exposure control circuit 119. At the time of the exposure, the rotor 2 and the opening lever 17 operate in exactly the same manner as in the above-stated case of drawing out the lens barrel. The relation of the current flowing to the coil 2A of the rotor 2 to time is as shown in FIG. 5A. Referring to FIG. 5A, a part 51 consists of short pulses which represent the current supplied for drawing the lens out. A part 52 consists of a long pulse representing a current supplied for the exposure. Another part 53 shows a current supplied at the time of resetting or for bringing the lens barrel 15 back to its initial position. FIG. 5B shows a relation between time and the turning angles of the rotor 2 and the opening lever 17. In FIG. 5B, a full line 54 represents the turning angle of the rotor 2 and a broken line 55 that of the opening lever 17. Further, a hatched part 56 indicates a period of an exposure. As apparent from the drawing, the length of time of power supply to the rotor 2 is longer for the exposure. Therefore, the opening lever 17 turns further than, a turning angle (57) of the opening lever 17 obtained when the shutter blades 19 and 20 begin to open (hereinafter will be called a pin-hole angle of rotation) to effect an exposure. At the time of the exposure, light measurement is performed and the length of time (52) for power supply to the rotor 2 is determined to obtain an apposite exposure. Since the operation of the rotor 2, etc. is performed in exactly the same manner both for drawing out the lens (51) and for an exposure (52), when the power supply to the coil 2A of the rotor 2 is cut off to bring the rotor 2 back to the initial position at the time of an exposure (52), the lens barrel 15 is also drawn out to an extent corresponding to one tooth. As mentioned in the foregoing, the lens barrel 15 is drawn out only after the rotor 2 has turned clockwise and the edge of the slot 2a has abutted on the claw part 9b of the lens driving lever 9. In other words, it is at the time (58) when the rotor 2 turns clockwise further than the pin-hole angle of rotation (57) that the edge 2a of the slot 2 comes to abut on the claw part 9b of the lens driving lever 9. This arrangement prevents the lens barrel 15 from moving before completion of the exposure.

Meanwhile, when the output level of the first timer circuit 118 becomes high, the second timer circuit 123 begins to operate at the same time as the exposure control circuit 119 which includes the light receiving element 34 begins to perform exposure control. The second timer circuit thus counts a time for termination of the operation of the shutter. A signal indicative of either completion of the exposure or the lapse of the termination time, whichever is sooner, is produced through the OR gate 120. This output of the OR gate 120 is applied to the AND gate 122 after it is inverted to a low level by the inverter 121. This makes the output level of the AND gate 122 low. The power supply to the rotor 2 comes to an end and the shutter blades begin to close. The high level output of the OR gate 120 is supplied also to the third timer circuit 124. The third timer circuit 124 then counts a time required for allowing the shutter blades to sufficiently close. When that time has been counted, the third timer circuit 124 produces and supplies a high level output to the AND gate 108. Meanwhile, the latch circuit 116 latches a low level output of the counter 112. The low level output of the latch circuit 116 is inverted into a high level by the inverter 115 and is then supplied to the other input terminal of the AND gate 108 via the OR gate 114. As a result, the output level of the AND gate 108 becomes high and the output level of the OR gate 109 also becomes high. This renders the pulse generating circuit 110 operative. The coil 2A of the rotor 2 is energized and the lens barrel 15 is driven in the manner as described in the foregoing. At the same time, the counter 112 begins to add the driving pulses to the counted value which has previously been obtained. Upon completion of counting such a number of driving pulses that represents a length of time required from the initial position to a point at which the switch 16 performs a switching action, the counter 112 produced a high level output and supplies it to the inverter 115. A low level output thus obtained is supplied to the OR gate 114. To the other input terminal of the OR gate 114 is applied a high level output of the lens barrel position detecting circuit 117. Therefore, the output of the OR gate 114 remains at a high level. The lens barrel 15 thus continues to be driven. With the lens barrel 15 being thus drawn out, when the pin 15a of the lens barrel 15 comes to fall off the cam 12a of the rotating ring 12, the lens barrel 15 comes back to its initial position. With the lens barrel thus having returned to the intitial position, the switch 16 turns on. The output level of the lens barrel position detecting circuit 117 changes to a low level. The output level of the OR gate 114 also becomes low. The output levels of the AND gate 108 and the OR gate 109 also become low. The pulse generating circuit 110 ceases to operate. The operation of the camera then comes to an end with the lens barrel 15 in its initial position.

The driving force which is generated with the rotor energized causes the rotor 2 to turn against the force of the spring 4; causes the lens driving lever 9 to turn counterclockwise; and causes the locking lever 21 to turn counterclockwise against the force of the spring 22 in such a way as to unlock the opening lever 17. The spring force of the spring 4, i.e. a torque for turning the rotor 2 in the clockwise direction, is used for drawing out the lens barrel 15; and also for causing the opening lever 17 to turn clockwise against the force of the spring 18. For the above-stated force relation, in this specific embodiment, the force for drawing out the lens barrel 15 is set at a value about ½ of the electromagnetic driving force of the rotor 2. The spring force of the spring 4 is set at a value about ¾ of the electromagnetic driving force of the rotor 2. This arrangement enables the lens barrel 15 to be stably drawn out and also prevents the magnetic circuit forming part and the rotor 2 from becoming unnecessarily large.

Figure 6:
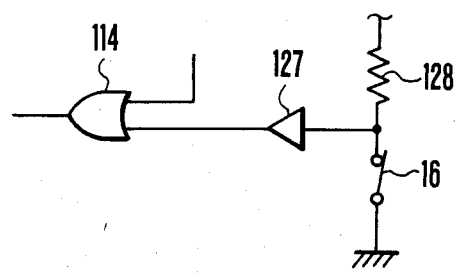
FIG. 6 is a circuit diagram showing by way of example the details of a lens barrel position detecting circuit shown in FIG. 4.

FIG. 6 shows by way of example the details of the lens barrel position detecting circuit 117 of FIG. 6. The circuit 117 includes a pull-up resistor 128; and a buffer 127. The switch 16 is on when the lens barrel 15 is in the initial position. Under that condition, the OR gate 114 is producing a low level output. With the lens barrel 15 being driven, the switch 16 turns off and a high level output is supplied to the OR gate 114.

In accordance with this invention, as described in detail in the foregoing, the photo-taking lens is drawn out with a current supplied to the coil of the rotor in a pulse-like manner. The power supply to the coil of the rotor is then continuously effected for driving the shutter. The invented arrangement obviates the necessity of charging the shutter and the lens barrel for driving them. The invention also obviates the necessity of effecting the power supply to the coil of the rotor in two drections, i.e. normal and reverse directions. It is another advantageous feature of the invention that the photo-taking lens is arranged to be drawn out by the last returning stroke of the rotor which is arranged to close the shutter for the purpose of preventing any movement of the photo-taking lens from occurring while the shutter is open. This arrangement eliminates the fear of having the lens drawn out during the process of an exposure.

What is claimed is:

1. A camera having an electromagnetically driven lens barrel, comprising:

a drive member to be moved from a first position to a second position thereof by an electromagnetic force, said drive member a coil to have said electromagnetic force generated when power supply is effected to said coil, and said drive member being arranged to come back from said second position to said first position when said power supply to said coil is cut off;

lens barrel step-advance means for step-advancing said lens barrel in response to the last stroke of movement of said drive member from said second position to said first position;

shutter operating means arranged to operate in response to the movement of said drive member from said first position to said second, said shutter operating means being arranged to perform a shutter opening operation while said drive member is in said second position for a time longer than a predetermined time; and control means for controlling power supply to said coil.

2. A camera according to claim 1, wherein said control means is arranged to cause said power supply to said coil to be effected in a pulse-like manner for having said lens barrel step-advanced by said lens barrel step-advnace means; and to cause said power supply to said coil to be effected for a time longer than the predetermined time for having said shutter operating means perform said shutter opening operation.

3. A camera according to claim 2, further comprising distance measuring means for measuring a distance to an object to be photographed; and wherein said control means is arranged to determine pulses to be produced therefrom on the basis of the result of distance measurement performed by said distance measuring means.

4. A camera according to claim 2, wherein said control means includes returning power supply means which is arranged to effect power supply to said coil in a pulse-like manner for causing said lens barrel step-advance means to perform a returning operation on said lens barrel; and to operate after the operation of said shutter operating means to cause said lens barrel to be brought back to the initial position thereof.

5. A camera according to claim 4, wherein said returning power supply means includes a switch which is arranged to render said returning power supply means inoperative and to be operated by the return of said lens barrel.

6. A drive device for a photographic optical system in a camera, comprising:

(A) an optical system adjustable in focal point by changing in position;

(B) a shutter;

(C) drive means for focal adjustment, which moves in a predetermined direction from its initial position by a predetermined current passage thereto, returns to the initial position by stoppage of the predetermined current passage and changes the position of the photographic optical system during the return to the initial position to perform the focal adjustment, said drive means opening the shutter when the predetermined current passage is effected longer than a predetermined time; and (D) control means for controlling the time of the current passage to the drive means longer than the predetermined time, said control means allowing the current passage to the drive means for a time longer than the predetermined time after completion of the focal adjustment of the photographic optical system.

7. A drive device according to claim 6, wherein the drive means includes electromagnetic drive means for driving by an electromagnetic force.

8. A drive device according to claim 6, wherein the drive means includes an elastic member for returning the drive means to the initial position.

9. A drive device according to claim 6, wherein the control means repeats the predetermined current passage to the drive means, thereby changing in a step-wise manner the position of the photographic optical system to perform the focal adjustment.

10. A drive device according to claim 9, wherein the control means includes retrun means for returning the photographic optical system to the initial position by changing in a step-wise manner the position of the photographic optical system again after the completion of the exposure operation.

11. A drive device according to claim 10, wherein the control means includes switch means for disabling the operation of the return menas in response to the return of the photographic optical system to the initial position.

12. A drive device according to claim 6, wherein the drive means includes a rotary member which rotates by current passage thereto and a drive member which changes the position of the photographic optical system in engagement with the rotary member, said rotary member and the drive member being coaxially supported.

13. A drive device for an optical system in a camera, comprising:

(A) an optical system variable in position;

(B) a ratchet member for changing the position of the photographic optical system by movement thereof;

(C) drive means which changes in position from its initial position in a predetermined direction by a predetermined current passage thereto;

(D) an elastic member for returning the drive means to the initial position;

(E) an association member for moving the ratchet member in response to the returning of the drive means; and (F) control means for changing in a step-wise manner the position of the ratchet member by repeating the current passage to the drive means in cooperation with the elastic force of the elastic member.

14. A drive device according to claim 13, wherein the drive means includes electromagnetic drive means for driving by an electromagnetic drive means for 15. A drive device according to claim 13, wherein the drive means and the association member are rotatable around the same rotation center.

16. A drive device for an optical system in a camera, comprising:

(A) electromagnetic drive means which rotates in predetermined direction from an initial position by an electromagnetic force;

(B) control means for rotating the electromagnetic drive means in normal and reverse directions by repeating the current passage to the electromagnetic drive means and (C) ratchet means for moving in a step-wise manner the optical system by a driving force given by the normal and reverse rotation of the electromagnetic drive means, said ratchet means including a drive member which is rotatable around the same rotation center as that of the electromagnetic drive means and to which the driving force of the electromagnetic drive means is transmitted.

* * * * *